United States Patent [19]

Cailly et al.

[11] Patent Number: 5,006,254

[45] Date of Patent: Apr. 9, 1991

[54] REDUCING THE RADIUM RADIOACTIVITY OF AQUEOUS EFFLUENTS

[75] Inventors: Francinet Cailly, Paris; Alain Leveque, La Rochelle; Jean-Louis Sabot, Maisons Laffitte, all of France

[73] Assignee: Rhone-Poulenc Chimie, Courbevoie, France

[21] Appl. No.: 186,289

[22] Filed: Apr. 26, 1988

[30] Foreign Application Priority Data

Apr. 28, 1987 [FR] France .................................. 87 6004

[51] Int. Cl.$^5$ .............................................. B01D 11/00
[52] U.S. Cl. ..................................... 210/639; 210/634
[58] Field of Search .................. 75/119; 210/634, 699, 210/511, 639; 423/100

[56] References Cited

U.S. PATENT DOCUMENTS 3,451,807  6/1969  Scribner et al. ................... 75/119 X
4,440,646  4/1984  Budnick ............................... 210/699

OTHER PUBLICATIONS

"Extraction of Alkaline Earth Metal and Magnesium Nitrates by Tri-n-butyl Phosphate" by Mikhailichenko et al. in the Russian Journal of Inorganic Chemistry, 16 (9), pp. 1363-1367 (1971).

*Primary Examiner*—Frank Spear
*Attorney, Agent, or Firm*—Burns, Doane, Swecker & Mathis

[57]  ABSTRACT

Prohibited radioactivity is removed from contaminated aqueous effluents containing both nitrate and radium values, by liquid/liquid extracting such effluents with an organic phase comprising at least one halogenated, preferably fluorinated β-diketone.

15 Claims, No Drawings

REDUCING THE RADIUM RADIOACTIVITY OF AQUEOUS EFFLUENTS

BACKGROUND OF THE INVENTION

1. Field of the Invention

The present invention relates to the elimination of hazardous radioactivity and, more especially, to the elimination of that radioactivity attributed to radium, from aqueous nitrate/radium solutions by liquid/liquid extraction.

2. Description of the Prior Art

Numerous hydrometallurgical processes result in the creation of radioactive effluents, which must be treated such as to diminish their radioactivity below a certain threshold imposed by law for their discharge into waterways or the seas.

Particularly exemplary of such processes is leaching, for the treatment of uranium containing minerals or rare earth minerals, such as monazite or apatite. Over the course of these processes, uranium or rare earth compounds are recovered, together with effluents notably containing radium 226 and 228, especially in a nitrate medium. The most severe regulations impose on these effluents a maximum radium content of 30 p Ci/l for radium 228 and 10 p Ci/l for radium 226.

A known treatment for the recovery of these radioactive elements consists of the precipitation of a compound that it is only very slightly soluble in water, such as barium sulfate. Thus, a solid containing radioactive species is obtained, which may be transported to a center for the treatment of radioactive waste.

However, this precipitation method is expensive, as the reagent cannot be recycled. Furthermore, in certain cases it may be too inefficient, in particular in the case of effluents comprising a nitrate medium, as nitrates are complexing agents for radium.

SUMMARY OF THE INVENTION

Accordingly, a major object of the present invention is the provision of an improved process for the facile and efficient elimination of radium values from certain effluents comprised thereof.

Briefly, the present invention features the elimination of radioactivity from aqueous solutions containing a nitrate and radium values, by liquid/liquid extracting said solution with a initial organic phase comprising at least one extractant having the formula (1):

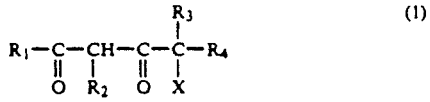

wherein $R_1$ is an alkyl, aryl, alkylaryl, arylalkyl radical, optionally substituted by a halogen atom, or a heterocycle; $R_2$ is hydrogen or an alkyl radical; X is a halogen atom; and $R_3$ and $R_4$, which may be identical or different, are each hydrogen, halogen, or an optionally halogenated alkyl radical;

and then recovering a final organic phase charged with radium and an aqueous phase substantially purified of such radium values.

The liquid/liquid extraction process of the invention thus provides a highly efficient technique for the elimination of radium values and the production of aqueous effluents satisfying even the most stringent radioactivity standards.

DETAILED DESCRIPTION OF THE PREFERRED EMBODIMENTS OF THE INVENTION

More particularly according to the present invention, the beginning aqueous solution contains radium in a nitrate medium.

The quantity of the radium may vary over wide limits, for example, from 10 pCi/l to 10 μCi/l. Typically, it is in the vicinity of 1 μCi/l.

As above indicated, the beginning aqueous solution comprises a nitrate medium. Generally, the aqueous solution contains an ammonium nitrate or an alkali metal nitrate. The nitrate concentration is usually at least 0.5 M, more particularly at least 1 M and may vary, for example, from 0.5 to 5 M, and preferably from 1 to 3 M.

The pH of the initial aqueous solution is in principle at least equal to 7, in particular from 7 to 12, and preferably from 7 to 9, for ammonium nitrate, and from 7 to 12 for an alkali metal nitrate. In the case in which the pH of the initial aqueous solution is less than 7, it is preferably adjusted to a value of at least 7, by the addition, for example, and depending on the particular case, of ammonia or an alkali metal hydroxide.

The initial organic phase will now be described in greater detail.

Primarily, this phase contains at least one extractant. Such extractant is a β-diketone halide having the formula (1) given above. Preferably, fluorinated β-diketones are used, i.e., those in which the radical X is fluorine, with the radicals $R_3$ and $R_4$ either being fluorine or other halogen atoms. More preferably, X, $R_3$ and $R_4$ are all fluorine.

The nature of the radical $R_1$ may vary widely. It may be an alkyl, aryl, alkylaryl or arylalkyl radical, optionally substituted by a halogen atom, in particular fluorine. $R_1$ may also be a heterocycle, for example of the type of thienoyl, furoyl, pyrrolyl, and the like.

Exemplary of such diketones of the formula (1), representative are fluoroacetylacetone, difluoroacetylacetone, trifluoroacetylacetone, propionyldifluoroacetone, isovaleryltrifluoroacetone, heptanoyltrifluoroacetone, benzoyltrifluoroacetone, 2-thienoyltrifluoroacetone, p-fluorobenzoyltrifluoroacetone, p-phenylbenzoyltrifluoroacetone, β-naphthoyltrifluoroacetone, 2-furoyltrifluoroacetone, phenylacetyltrifluoroacetone, 3-phenylpropionyltrifluoroacetone, p-methylbenzoyltrifluoroacetone, and p-ethylbenzoyltrifluoroacetone.

In one embodiment of the invention, fluorinated β-diketones of formula (1) are used, in which $R_1$ is a phenyl radical substituted by an alkyl radical having 1 to 25 carbon atoms, and, more preferably, fluorinated β-diketones are used having the formula:

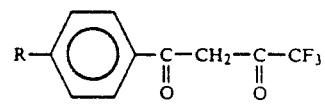

with R being an alkyl radical as above defined.

Advantageously, the organic phase also contains a diluent in which the extractant is dissolved.

Exemplary diluents are, whether alone or in combination, compounds such as aliphatic or aromatic hydrocarbons, halogenated solvents, such as, for example, kerosene, SOLVESSO ®, products of the type of FLUGENE ®.

The organic phase may also contain a modifier, such as, for example, a long chain alcohol (6 to 14 carbon atoms), or an alkylphenol.

In a preferred embodiment of the invention, the initial organic phase also contains an auxiliary compound, advantageously a neutral organophosphorus agent. Such compounds are characteristically phosphates, phosphonates, phosphinates and phosphine oxides, and in particular the alkyl, aryl or alkylaryl derivatives thereof.

Tributylphosphate is exemplary of the phosphates.

As examples of the phosphonates, the following are representative: dibutyl butyl phosphonate (DBBP), di-2ethylhexyl (2-ethylhexyl) phosphonate (DHEHP), bis($\beta$-chloroethyl)vinyl phosphonate, tetra-ethyldecylene diphosphonate $(C_2H_5O)_2$—OP—$CH_2$—$(CH_2)_8$—$CH_2$—$PO(OC_2H_5)_2$, tetraethylbutylene diphosphonate $(C_2H_5O)_2$—OP—$CH_2$—$(CH_2)_2$—$CH_2$—$PO(OC_2H_5)_2$, tetraisopropylmethylmethylene diphosphonate $(i—C_3H_7O)_2$—OP—$CH(CH_3)$—$PO(iC_3H_7O)$.

Representative phosphinates are dioctylmethylphosphinate and di(2-ethylhexyl)2-ethylhexyl phosphinate.

Exemplary phosphine oxides are, for example, di-n-hexylmethoxyoctylphosphine oxide (DHMOPO), tri-n-butyl-phosphine oxide (TBPO), trioctylphosphine oxide (TOPO), tri-2-ethylhexylphosphine oxide, and the mixture of phosphine oxides marketed under the trademark CYANEY 923.

The auxiliary compound may also be a sulfoxide.

Among such sulfoxides, diheptylsulfoxide and methyldodecylsulfoxide are exemplary.

The concentration of the extractant or extractants and optionally of the auxiliary compound in the diluent typically ranges from about 10 to 90% by weight. This concentration is a function, in particular, of the desired physical properties of the initial organic phase.

The amount of the auxiliary compound may vary over wide limits, advantageously from 0.1 to 10 times the amount by weight of the extractant(s).

The temperature at which the aqueous solution and the initial organic phase are contacted is not critical. This temperature may be dictated by the process which produced the radioactive aqueous solution to be treated. It may also depend on the nature of the extractant used. In actual practice, this temperature typically ranges from ambient to approximately 80° C.

The above-mentioned two phases are contacted with each other and the extraction is carried out in known manner, for example, in a mixer-decantation of column type.

Advantageously, the extraction is carried out continuously and countercurrently, in several stages.

Following the contacting, a final organic phase charged with radium values is obtained, as is an aqueous phase with an extremely low radium content, for example less than 20 pCi/l.

The organic phase may then be back-extracted with an aqueous acid solution, for example a nitric acid solution, at a very high organic phase/aqueous phase ratio.

The organic phase may be recycled to the extraction stage and the aqueous phase obtained after back-extraction, charged with radium, may be subjected to any known treatment to recover this element.

In order to further illustrate the present invention and the advantages thereof, the following specific example is given, it being understood that same is intended only a illustrative and in nowise limitative.

EXAMPLE

An aqueous effluent having the following composition was processed:

| | |
|---|---|
| $NH_4NO_3$ | 200 g/l |
| $Ra^{228}$ | 1 μCi/l |

One liter of this solution was contacted three times successively, under agitation, each time with 0.5 liter of a solvent based on LIX 51, a product marketed by Henkel and having the following formula:

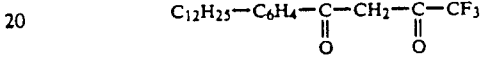

at a concentration of 200 g/l, and 200 g/l of TOPO diluted in kerosene. During the agitation, an amount of concentrated ammonia necessary to provide a pH of 8.2 was introduced.

After decantation and separation of the phases, an ammonium nitrate effluent was obtained having the following composition:

| | | |
|---|---|---|
| $NH_4NO_3$ | = | 190 g/l |
| $Ra^{228}$ | | ≤20 pCi/l (limit of detection). |

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for reducing the radioactivity of an aqueous solution containing both nitrate and radium values, comprising adjusting the pH of the initial aqueous phase to at least 7.0, liquid/liquid extracting such solution with an organic phase which comprises at least one extractant having the formula (1):

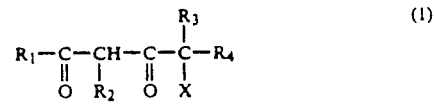

wherein $R_1$ is an alkyl, aryl, arylalkyl, or alkylaryl radical, a halo-substituted such radical, or a heterocycle, $R_2$ is hydrogen or an alkyl radical, X is a halogen atom, and $R_3$ and $R_4$, which may be identical or different, are each hydrogen, halogen, an alkyl radical or a halogenated alkyl radical, whereby providing a final organic phase charged with said radium values and a final aqueous phase purified thereof, and recovering said purified final aqueous phase.

2. The process as defined by claim 1, wherein said at least one extractant having the formula (1), X is fluorine.

3. The process as defined by claim 2, wherein said at least one extractant having the formula (1), $XR_3$ and $R_4$ are each fluorine.

4. The process as defined by claim 1, wherein said at least one extractant having the formula (1), $R_1$ is an aryl radical or an alkyl substituted such radical, the alkyl moiety of which containing from 1 to 25 carbon atoms.

5. The process as defined by claim 1, wherein the initial organic phase further comprises a neutral organophosphorus compound or a sulfoxide.

6. The process as defined by claim 5, said initial organic phase further comprising a neutral organophosphorus compound selected from the group consisting of a phosphate, phosphonate, phosphinate, phosphine oxide and admixture thereof.

7. The process as defined by claim 1, wherein the initial organic phase comprises a diluent.

8. The process as defined by claim 7, said diluent comprising a diluent selected from the group consisting of an aliphatic hydrocarbon, aromatic hydrocarbon, and a halocarbon.

9. The process as defined by claim 1, wherein the initial organic phase further comprises a long chain alcohol or an alkylphenol.

10. The process as defined by claim 1, wherein the pH ranges from 7 to 12.

11. The process as defined by claim 1, wherein the initial aqueous phase comprises an alkali metal or ammonium nitrate.

12. The process as defined by claim 11, wherein the nitrate concentration in the initial aqueous phase is at least 0.5 M.

13. The process as defined by claim 12, said nitrate concentration being at least 1 M.

14. The process as defined by claim 1, further comprising back-extracting the final organic phase with an aqueous acid solution.

15. The process as defined by claim 1, carried out continuously and countercurrently.

* * * * *